(12) United States Patent
Speasl et al.

(10) Patent No.: US 11,831,710 B2
(45) Date of Patent: Nov. 28, 2023

(54) TRACKING AND CERTIFICATION OF DIGITAL MEDIA VIA DISTRIBUTED LEDGER

(71) Applicant: ImageKeeper LLC, Las Vegas, NV (US)

(72) Inventors: Jerry Speasl, Las Vegas, NV (US); Michael Patterson, Sherman, TX (US); Marc Roberts, St. Louis, MO (US)

(73) Assignee: IMAGEKEEPER LLC, Las Vegas, NV (US)

( * ) Notice: Subject to any disclaimer, the term of this patent is extended or adjusted under 35 U.S.C. 154(b) by 0 days.

(21) Appl. No.: 17/364,597

(22) Filed: Jun. 30, 2021

(65) Prior Publication Data

US 2021/0409489 A1  Dec. 30, 2021

Related U.S. Application Data

(60) Provisional application No. 63/046,406, filed on Jun. 30, 2020.

(51) Int. Cl.
| | | |
|---|---|---|
| *H04L 67/1074* | (2022.01) | |
| *H04L 9/32* | (2006.01) | |
| *G06F 16/908* | (2019.01) | |
| *G06F 16/951* | (2019.01) | |
| *G06F 16/901* | (2019.01) | |
| *H04L 9/00* | (2022.01) | |

(52) U.S. Cl.
CPC .......... *H04L 67/108* (2013.01); *G06F 16/908* (2019.01); *G06F 16/9014* (2019.01); *G06F 16/951* (2019.01); *H04L 9/3236* (2013.01); *H04L 9/50* (2022.05); *H04L 2209/60* (2013.01)

(58) Field of Classification Search
CPC ....... H04L 67/108; H04L 9/3236; H04L 9/50; H04L 2209/60; G06F 16/9014; G06F 16/951; G06F 16/908
See application file for complete search history.

(56) References Cited

U.S. PATENT DOCUMENTS

| | | | |
|---|---|---|---|
| 10,572,855 B1* | 2/2020 | Levy | G06K 19/0723 |
| 2019/0207781 A1* | 7/2019 | Harpur | G06F 40/20 |
| 2019/0325115 A1* | 10/2019 | Wilkinson | G06Q 20/02 |
| 2019/0377724 A1* | 12/2019 | Pennington | G06Q 20/06 |
| 2020/0112427 A1* | 4/2020 | Nakamura | H04L 9/3239 |

* cited by examiner

*Primary Examiner* — Azizul Choudhury
(74) *Attorney, Agent, or Firm* — POLSINELLI LLP

(57) ABSTRACT

Copies of a distributed ledger with multiple blocks are stored on multiple computing devices and a secure server that stores a plurality of authenticated digital media asset. A first computing device with an authenticated digital media asset generates a new block to the distributed ledger, and each subsequent computing devices with modifications made to the digital media asset adds a new block identifying modification made to the digital media asset and appends a hash of at least a portion of a previous block of the distributed ledger.

23 Claims, 9 Drawing Sheets

Storing a distributed ledger comprising a plurality of blocks, wherein each of a plurality of computing devices also stores a copy of the distributed ledger 805

Receiving an digital media asset from a computing device 810

Generating a hash of at least a portion of a most recent block of the distributed ledger 820

Generating a new block header for a new block, wherein the new block header comprises at least the hash of the most recent block of the distributed ledger 825

Generating the new block, wherein the new block comprises at least the new block header and one or more iterations corresponding to one or more changes 830

Appending the new block to the plurality of blocks of the distributed ledger 835

Transmitting the new block to the plurality of computing devices that each store the distributed ledger in response to verifying the intended modification, wherein each of the plurality of computing devices also appends the new block to their respective copy of the distributed ledger, thereby recording the one or more iterations in the distributed ledger 840

TRACKING AND CERTIFICATION OF DIGITAL MEDIA VIA DISTRIBUTED LEDGER

CROSS-REFERENCE TO RELATED APPLICATION

The present application claims priority benefit of U.S. provisional application 63/046,406 titled "Blockchain Certified Content History and Control," filed Jun. 30, 2020, the disclosure of which is incorporated herein by reference.

BACKGROUND

Field of the Invention

The present invention generally relates to digital imaging. More specifically, the present invention relates to secure managing and tracking of digital media on a secure server using distributed ledgers.

Description of the Related Art

Media content continues to grow at a rapid pace unprecedented in modern times. While consumers of media content have access to specific media content from hundreds of thousand different sources, there is a need for the consumers to immediately and independently verify the authenticity of the media and access additional information of the media. Further, there is a need to track history of the digital media to ascertain the extent of the modification to a digital media after its certification as being authentic.

Distributed ledgers offer improved security between parties compared to traditional centralized systems in that distributed ledgers are safe from outages due to their distributed nature and are nearly immutable. So far, use of distributed ledger technologies have largely remained confined to use with digital currencies such as Bitcoin.

Accordingly, a more secure, reliable, and distributed technology for tracking and authentication of digital media is needed.

SUMMARY OF THE PRESENTLY CLAIMED INVENTION

A method and a system of authenticating and tracking of digital media asset via a distributed ledger stored at each of a plurality of computing devices of a distributed computing architecture is disclosed. The method and the system includes storing the distributed ledger associated with an authenticated digital media asset in a secure server, the distributed ledger including a plurality of blocks. The method and the system also includes generating a new block in response to receiving a new iteration of the authenticated digital media asset, wherein the new block includes one or more iterations identifying one or more changes in the authenticated digital media asset, wherein the new block includes a new block header that includes a hash of a prior block of the distributed ledger. The new block is appended to the plurality of blocks in the distributed ledger, updating the distributed ledger. The updated distributed ledger is stored in all the devices that are related to the authenticated digital media asset and its iterations.

The system includes a non-transitory computer-readable storage medium that stores a distributed ledger including a plurality of blocks, wherein each of the plurality of computing devices also stores a copy of the distributed ledger.

BRIEF DESCRIPTION OF THE DRAWINGS

FIG. 8 is a flow diagram illustrating operations for digital media asset authentication and tracking via distributed ledger.

DETAILED DESCRIPTION

Techniques for secure digital media processing may be used to certify a digital media asset by verifying that the digital media asset is authentic and unaltered. The certified digital media and data associated with the digital media may be maintained at a cloud-based server for viewing, authorized editing, and subsequent distribution. The cloud-based server may maintain a copy of a distributed ledger with multiple blocks to ensure that the original digital media asset is authentic and to account for any subsequent edits made to the original digital media asset. Copies of the distributed ledger with multiple blocks may be stored on multiple computing devices of each of the users who modifies the digital media asset at each iteration with the permission of the prior users. Artificial intelligence (AI) may be utilized in conjunction with the secure digital media authentication and tracking system in detecting any unauthorized modification to the original digital media asset and to determine at which iteration the unauthorized modification occurred. An alert may be sent to the original digital media asset owner when unauthorized modification is detected.

The authentication and tracking systems and methods described herein ensures that the original digital media asset is authentic and unaltered. In some examples, the authentication and tracking systems and methods described herein track each of the iteration of a digital media asset in the distributed ledger. This is an improvement over the traditional systems in which the history of the modification made to the digital media asset may only be stored in a local or central server because the distributed ledger is safe from outages and is immutable to unauthorized changes attempted on the ledger. Moreover, any unauthorized changes made to the digital media asset are easily detected based on the history of the digital media asset stored in the distributed ledger, providing improved security over other approaches.

Figure 1:
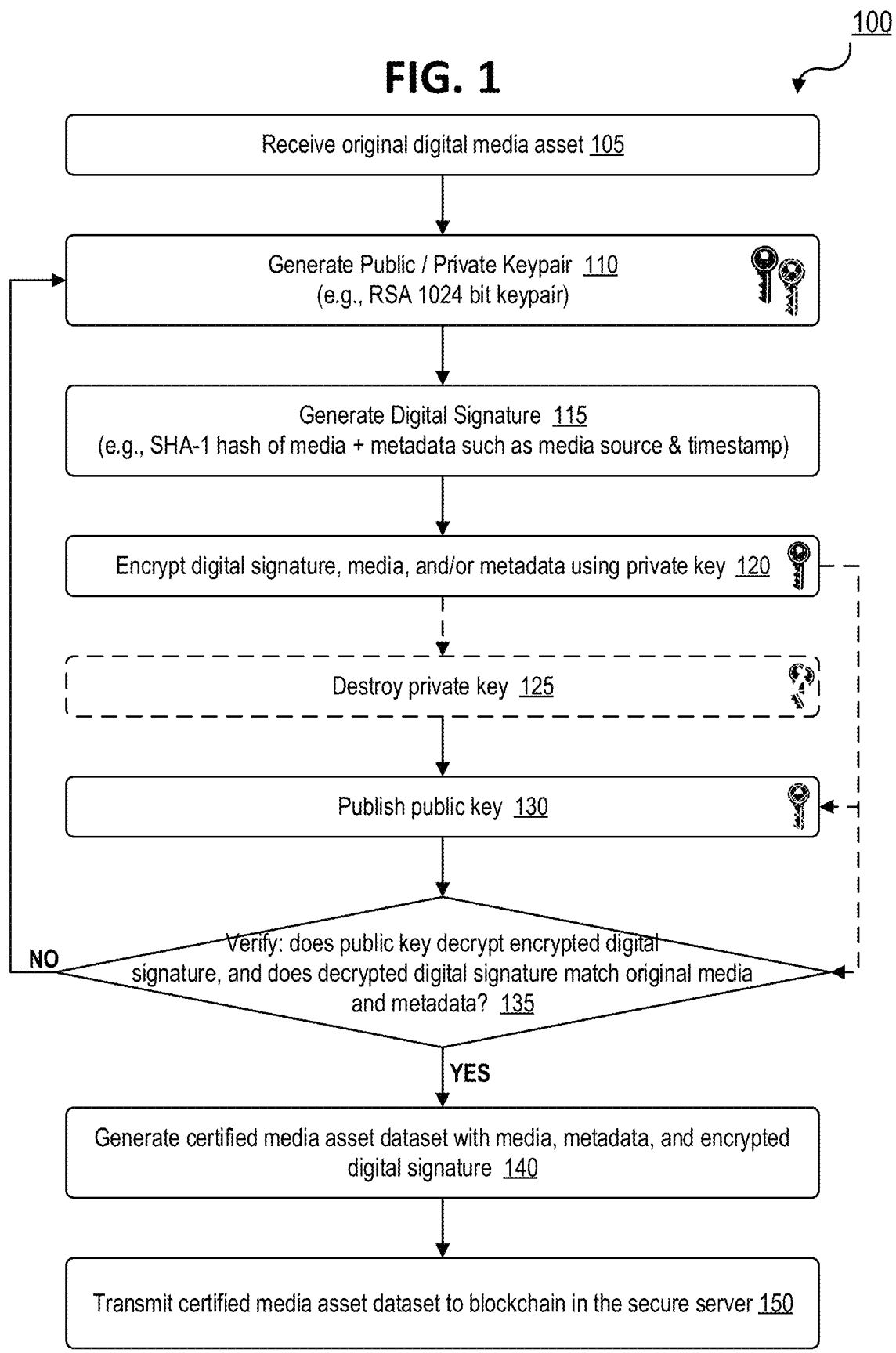
FIG. 1 is a flow diagram illustrating operations for media certification.

FIG. 1 is a flow diagram illustrating operations 100 for media certification. The operations 100 can be performed by a certification system. The certification system can include, for example, the authentication and tracking system 200, the computing device 205, a device that is part of the cloud 220, a server 225, a client device 230, a device storing the distributed ledger 250, a device hosting the web portal 240, a device accessing the web portal 240, a computing device 310, a user device 420, a secure server 450, one or more computing devices of a distributed architecture 425, a device storing the blockchain ledger 500, a device storing the directed acyclic graph (DAG) ledger 700, the digital asset tracking system that performs the operations 800, a computing system 900, or a combination thereof.

At operation 105, the certification system receives a media asset by a secure server from a computing device, optionally with its metadata as well. The metadata may include, for example, latitude and longitude coordinates from a GNSS receiver or other positioning receiver, an identification of the media capture device, a timestamp identifying date and time of capture, an altitude at capture, a heading at capture, an inclination at capture, a yaw at capture, a roll at capture, pitch at capture, a watermark, an annotation, any other data that might be found in image EXIF metadata, elevation or altitude, velocity at capture, path, speed, direction, distance, weather conditions, barometer reading & change, dew point, humidity, sun angle, temperature, compass heading, media certification status, annotation certification status, incident note certifications status, incident report certification status, event number, time, date, time zone, title, media type (IR, multi-spectrum, lidar, UV, 2-dimensionality, 3-dimensionality), wind speed, wind direction, radar data, cloud coverage, visibility, flood data, any other metadata discussed herein, or combinations thereof. Examples of the media asset include digital media assets captured by the computing device 205, the digital media asset 320, the digital media asset 405, the digital media asset of operation 810, or a combination thereof.

At operation 110, the certification system generates an asymmetric public key infrastructure (PKI) key pair—with a private key and a corresponding public key. In some cases, the keys of the key par may be RSA 1024 asymmetric keys. Other types of asymmetric keys may be used.

At operation 115, the certification system computes a digital signature by generating a hash digest—optionally using a secure hash algorithm such as SHA-256 of the captured media, and optionally of the metadata as well. At operation 120, the certification system encrypts the digital signature with the private key. The media and/or metadata may also be encrypted using the private key. The private key is optionally destroyed at operation 125, or may simply never be written to non-volatile memory in the first place.

At operation 130, the certification system publishes the public key, either by sending the public key to the servers to be verified, or by otherwise sending the public key for publication in another publicly accessible and trusted network location. At operation 135, the certification system verifies the authenticity of the media and metadata by decrypting the encrypted digital signature using the public key before or after publication at operation 130, and verifying whether or not the hash digest stored as part of the decrypted digital signature matches a newly generated hash digest of the digital media. The certification system may transmit the public key to other computing devices or the same computing device as the first computing device that sent the original digital media asset, in order to modify the digital media asset. The same can be done using the metadata if a hash digest of the metadata is included in the digital signature. The verification as to the authenticity of the media and metadata at operation 135 may also include the certification system decrypting the media asset and/or the metadata itself, if either or both were encrypted at operation 120. This verification may occur at the digital media capture device—though it may instead or additionally be performed at the server. Once the authentication of operation 135 succeeds, the certification system generates a certified media dataset by bundling the media, metadata, and the encrypted digital signature, for example in a zip file or other compressed archive file. The certification system may also bundle the public key with the media, metadata, and the encrypted digital signature, though additional security may be provided by publishing it elsewhere to a trusted authentication server. At operation 145, the certification system may transmit the certified media dataset (and optionally the public key) to a secondary device, such as a server or a viewer device.

In some cases, the certification system may certify additional data besides the media asset and associated metadata, either or separately from the media asset or together with the certification of the media asset. If the additional data is certified together with the media asset, the hash and digital signatures at operation 115 may be hashes of the media asset as well as the additional data, thereby certifying the media asset along with the additional data. If the additional data is certified separately from the media asset, the entire process 100 may be repeated, with the additional data treated as a media asset. Additional data may include alterations or annotations to a media asset, or at least a subset of a report that is generated based on the media asset, or at least a subset of a report that is generated to include the media asset. Metadata corresponding to the additional data in some cases identifying one or more author(s) of the additional data and/or one or more devices on which the additional data was generated and/or certified, and/or from which the additional data was submitted to the server(s).

In other words, the operations 100 of FIG. 1 illustrate data integrity precautions that can be taken. For example, all data (e.g., media asset and/or additional data and/or metadata) can, in some embodiments, be secured in a local database with a globally unique identifier to ensure its integrity. The asset's security and integrity can be ensured via a Digital Signature that is made up of a SHA1 digest, the time that the asset was captured and the device of origin. This allows the mobile app or server to detect changes due to storage or transmission errors as well as any attempt to manipulate or change the content of the asset. The Digital Signature can be encrypted with a public/private key-pair that is generated uniquely for that asset by the first computing device. The private key can be destroyed by the first computing device sending the digital media asset and/or never written to a disk or stored in a memory of the computing device or any other device; as such, this ensures that the asset cannot be re-signed and cannot be changed without those changes being detectable.

The computing device also generates and/or extracts metadata (e.g., EXIF metadata) corresponding to the digital media asset, for example identifying the digital media capture device, a timestamp of capture, a date of capture, an author or owner of the computing device, and any other metadata. A digital signature is generated by generating a hash of both the digital media and at least some of this metadata. For example, the digital signature may be a hash of the captured media, the timestamp, and an identifier of the digital media capture device that captured the media. The hash may be computed using a secure hash algorithm, such as SHA256. The first computing device and/or a second device that receives the media asset from the first computing device may then generate a public and private key pair using a public key infrastructure (PKI), where the keys may be for example RSA 1024 bit keys. The private key is used to encrypt the digital signature, and may then be deleted, erased, and/or destroyed, in some cases via overwriting for more security. The certified media asset—meaning the media asset, the encrypted digital signature, and the (optionally encrypted) metadata—are uploaded to the cloud severs, in some cases along with the public key, optionally securely via HTTPS or another secure network transfer protocol. The public key may be uploaded to the same cloud server(s) or to a different system, such as a certificate authority (CA) server. The media asset and its metadata are now certified. Any server or client can retrieve the public key from the cloud server system or CA server and decrypt the encrypted digital signature to verify that it matches a new hash generated using media asset and/or metadata at a later time, thereby verifying that the media asset and metadata have not been changed since certification. The same certification process may be used for allowing subsequent devices to modify the digital media asset. The modified digital media that was given sufficient permission is granted certification and stored in the server. In some cases, such a verification check is performed at the first computing or second computing device before the media asset and metadata and encrypted digital signature and public key are sent by the first computing device or second device to the server(s). In some cases, such a verification check is performed at the server after receipt of the certified media asset.

Metadata may include, for example, time, date, location, media capture, orientation, media size, resolution, frame size, elevations, centimeter 3D GPS position, digital media capture device speed, heading, or some combination thereof.

Figure 2:
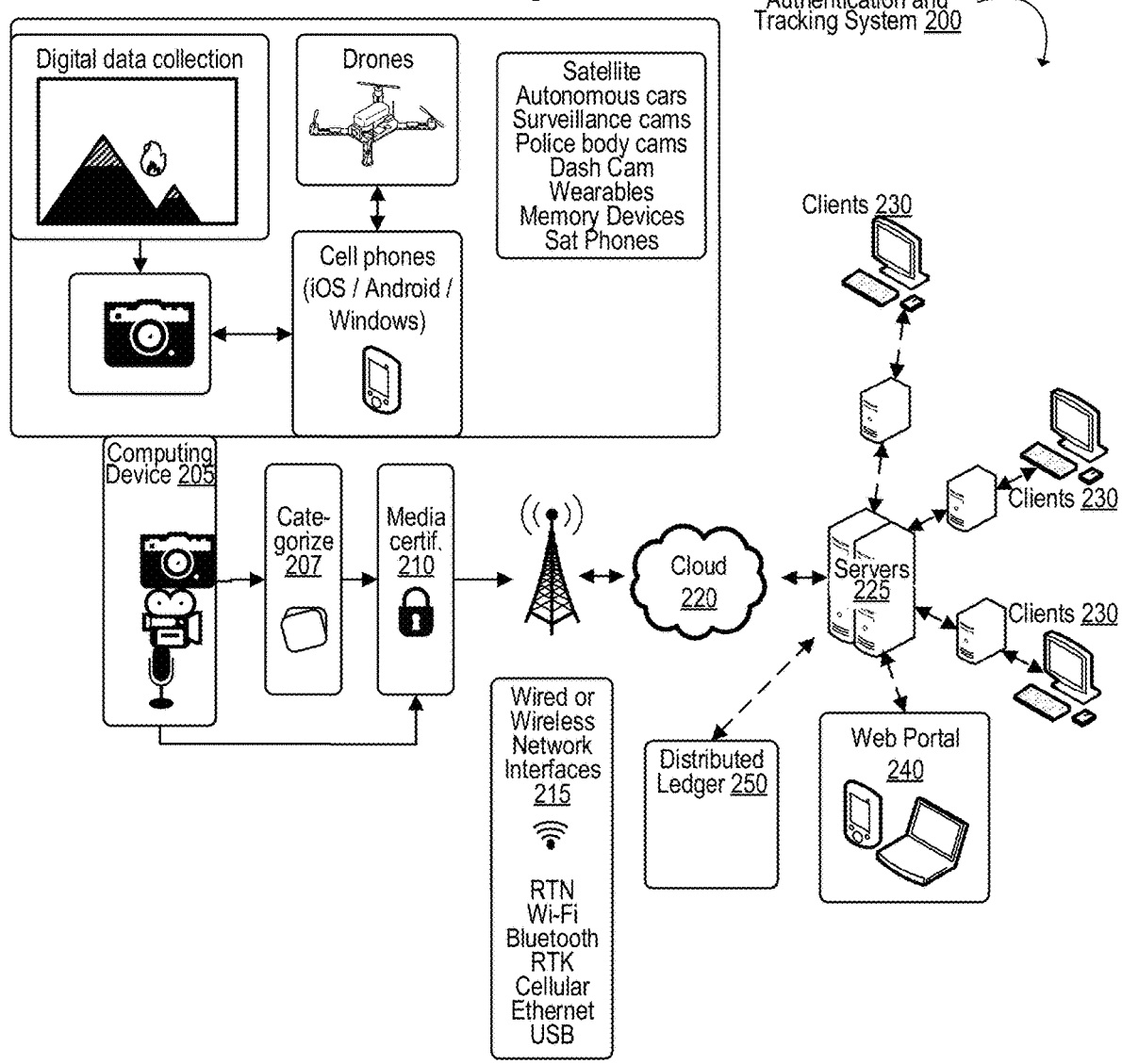
FIG. 2 illustrates a network architecture through which digital media may be certified, uploaded to a server network, verified, and distributed to computing devices.

FIG. 2 illustrates an exemplary authentication and tracking system 200 with a network architecture which digital media may be certified, uploaded to a server network, verified, and distributed. The digital media certification system of the authentication and tracking system 200 certifies the digital media received by the computing device 205. The digital media may be received by the camera, microphone, drones, or from an internal or external memory of the computing device. Metadata related to the capture of the digital media asset may also be received at this operation. The digital media asset data and/or sensor data may be categorized at a operation 207 (e.g., for example based on type of media, time, location, other metadata associated with capture of the digital media, or some combination thereof) and/or certified at a operation 210. Categorization 207 and/or certification 210 may occur at the digital media capture device or a second device that receives the digital media asset from the digital media capture device. In some cases, categorization 207 may be skipped.

The digital media asset data and the metadata are then autonomously sent to the internet/cloud system 220 via wired or wireless network 215. Such connections may include cellular networks (e.g., 3G, 4G, LTE, or 5G), W-Fi, wireless local area networks (WLAN), any other wired and/or wireless network interfaces discussed herein, or a combination thereof. The digital data is filed, stored and accessed through the web in a systematic or serialized format constant with image identification formed with the computing device 205.

The internet/cloud system 220 can include one or more server systems 225, which may be connected to each other. In one embodiment, this internet/cloud system 220 is a wireless multiplexed system for securely storing digital data to and from mobile digital devices. In another embodiment, the digital data (e.g., images, reports) are securely held in one central place, either by a hardware memory device, server, or a data center. In the preferred embodiment, the digital data is stored in the distributed ledger such as blockchain 250. The secure servers 225 may receive the public key transmitted by the certification system and use the public key to verify that the certified digital media data is authentic and unaltered.

Once the data is in the internet/cloud system 220, the data may be accessible through a web portal 240 via computing devices 230. This web portal 240 may include image-editing tools, worldwide access, and collaboration mechanisms available to other relevant individuals. Security, digital signature, watermarking, encryption of physical access, password credentials area can be utilized throughout the system. Original digital data can be confirmed, saved and protected though various technologies and system controls.

Figure 3:
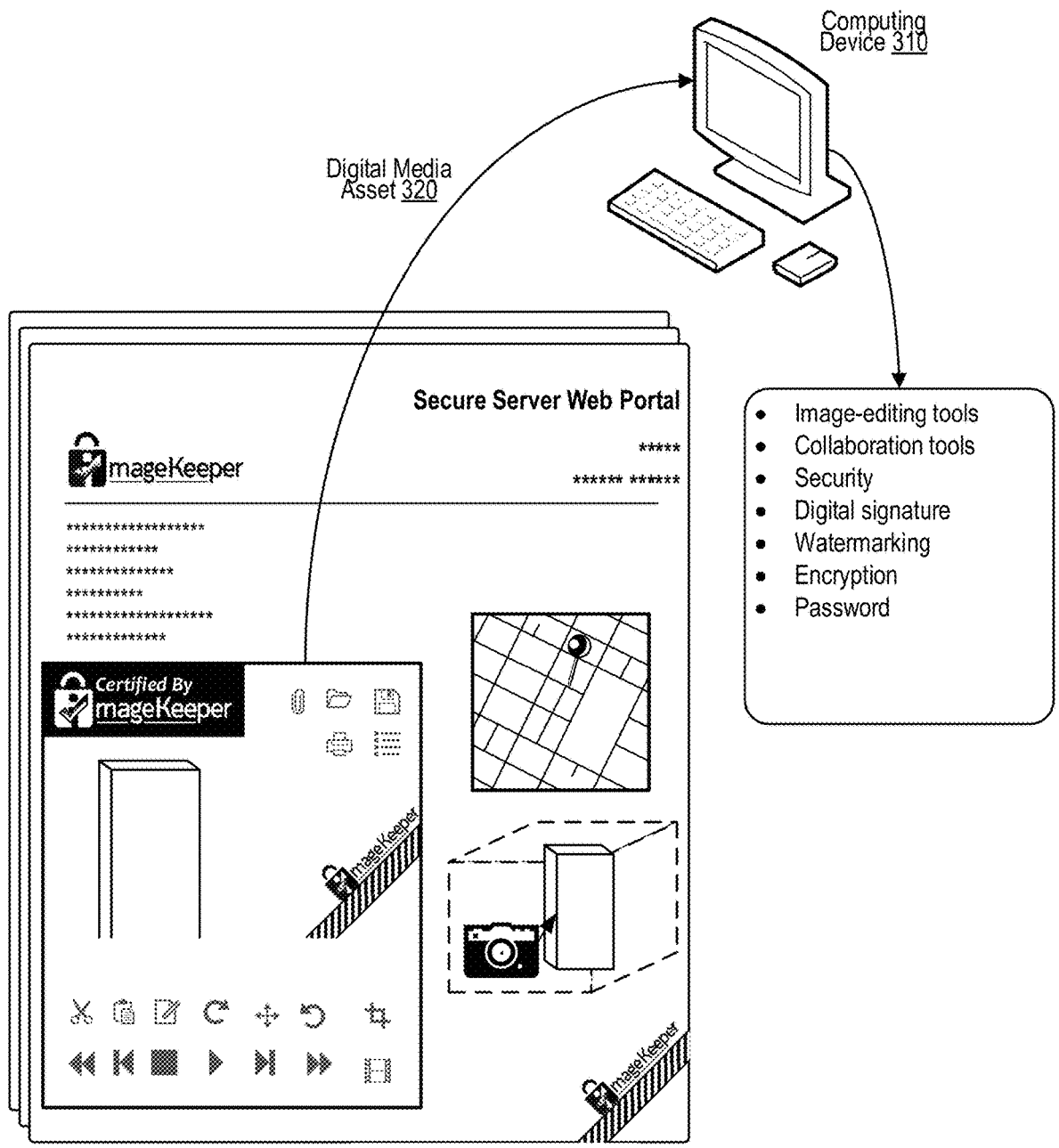
FIG. 3 illustrates an exemplary web portal display.

FIG. 3 illustrates an exemplary web portal display that may be used to view the digital media asset and the data associated with the digital media asset stored in the secure server and modify the digital media asset. This description of the digital media can include information such as an identification and/or contact information of the owners of the computing devices of each iterations of the digital media, the description of the digital media or event, GPS location of the digital media asset capture, existence of iterations of the digital media asset, identification and/or contact information of subsequent users who modified the original certified digital media asset, and description or extent to which each iteration modified the original digital media asset. The web portal may determine whether the computing device 310 viewing the digital media asset 320 has the permission to modify to the digital media asset 320 and allow and facilitate the computing device to modify the digital media asset 320. The authorization to modify may be given via password control or determined by the computing device having the public key that allows modification. The modified digital media asset 320 may be confirmed, saved and protected though various technologies and system controls, along with details and description of which portions were modified and to what extent.

Figure 4:
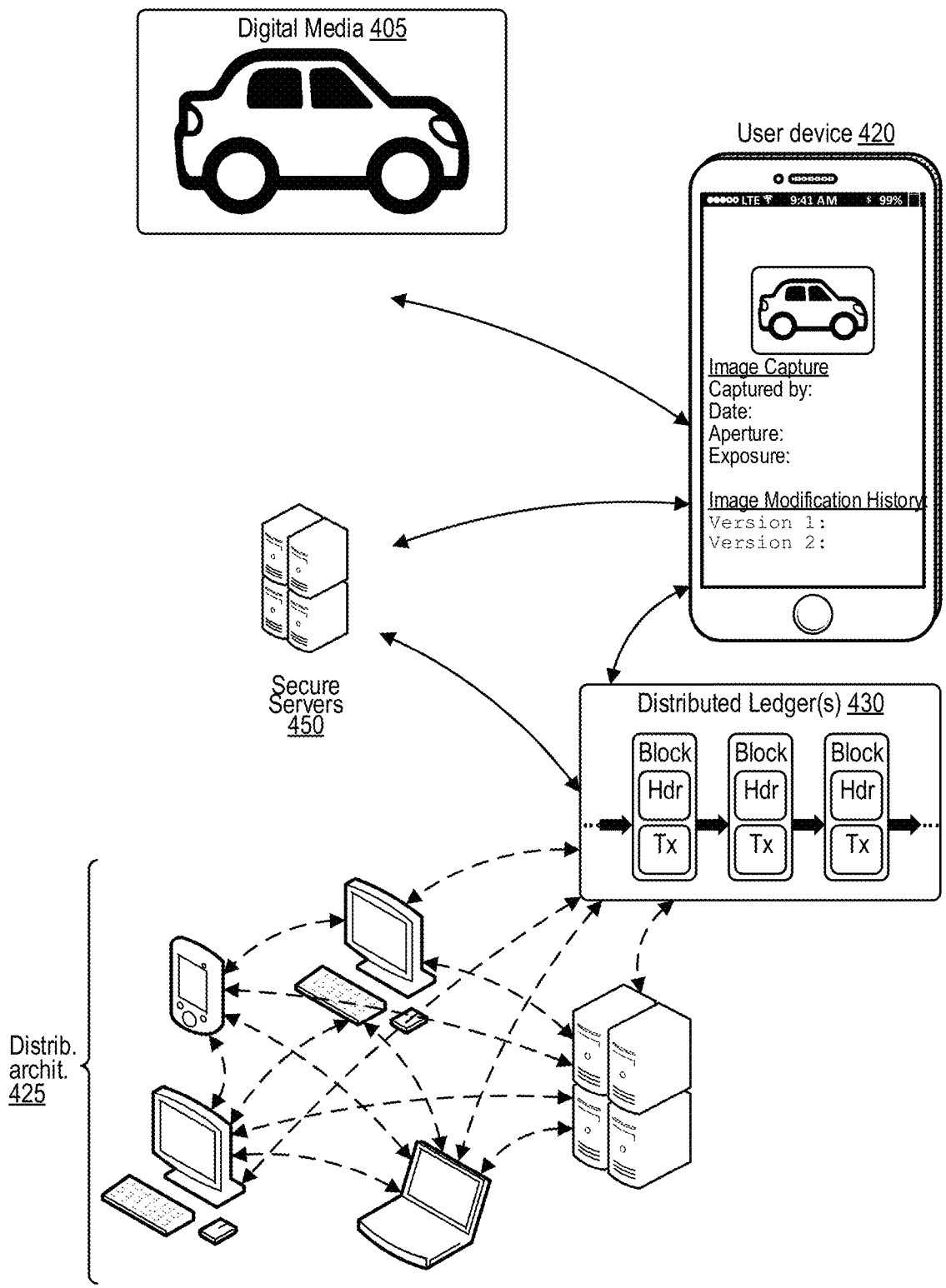
FIG. 4 illustrates exemplary distributed ledger with multiple blocks associated with the computing device of owners of each iterations of a digital media asset.

FIG. 4 illustrates exemplary distributed ledger 430 with multiple blocks associated with the computing device of owners of each iterations of a digital media asset, comprising the distributed architecture 425. The digital media asset 405 may be uploaded from the user device 420 to the secure servers 450 or directly to the distributed ledger 430. The secure server 450 may verify that each iteration of changes made to the original digital media asset is valid and generates a new block identifying changes to the original digital media asset. The new block may include the original digital media asset, a block header that includes a hash of a most recent block in the distributed ledger, and one or more verified chain of custody of the digital media asset. The secure server appends the new block to the distributed ledger and transmits the new block to the computing devices of other owners, so that each copy of the distributed ledger includes the new block. The user device 420 may add a new block corresponding to a new iteration of the digital media asset to the distributed ledger 430. To record the new iteration the user device 420 may have a public/private key pair, including a private key and a public key, that corresponds to that user device 420 in particular and/or to a particular user or individual that uses the user device 420.

The user device 420 may encrypt the digital media asset and the data associated with the digital media asset using the private key.

The user device 420 can then send this encrypted code to the computing devices of the distributed architecture 425, which may then verify, using the public key, that the code was encrypted using the corresponding private key, and that this public/private keypair corresponds to an user and/or device that is the owner of the next iteration of the digital media asset—for instance, by verifying that the public/private keypair corresponds to the prior iteration. Since the private key is inaccessible to anyone other than these users, nobody can pretend to be them. Each user's public key, on the other hand, is made available to each of the computing devices 900 of the distributed architecture 425 for this verification process, for example via one or more centralized certificate authority (CA) server(s) or a distributed certificate authority (CA) ledger stored on another distributed ledger 430. Verification can also entail checking to make sure that the digital media asset 405 is owned by the user that has the license, authorization, has made payment for royalty or license, or other permission from the original owner at the moment the change to the digital media was made, and that no concurrent conflicting iteration was also pending. Verification can further entail the order of the iteration or any non-linear forks in the iteration tree. For example, if a modification was made to the first iteration after second iteration was created, the verification system may note that the third iteration was a change from the first iteration, not the second.

The distributed ledger 430 may be a public distributed ledger or a private distributed ledger, sometimes referred to as a "permissioned" distributed ledger. Public distributed ledgers provide the benefit of unbiased verification by anyone with access to the ledger (and in general by a greater population), but have the risk of making public data that should remain secret or otherwise not be public. Private or privileged distributed ledgers reduce the risk of making public data that should remain secret or otherwise not be public, as they are only accessible to computers through one or more "gateway" servers controlling access to the distributed ledger by requiring that computing devices requesting access to the distributed ledger be authenticated (e.g. via a signature encrypted with a user's private key that is verified by a certificate authority with the corresponding public key) as having permission to access it. Private or privileged distributed ledgers can thus limit access to certain data (e.g., from competitors or malicious parties), but reduce the pool of verifying machines and thereby increase the risk of bias in blockchain verification procedures, and also introduce "trusted" middleman parties or servers such as the certificate authority that reduce the degree of decentralization introduce potential points of failure. To get the best of both worlds, there may effectively be a public "portion" and a private "portion" of a distributed ledger, which may actually in execution be a separate public distributed ledger and a separate private/permissioned distributed ledger. In a private or privileged distributed ledger, authentication by the gateway server and via the signature/certificate authority may be required to acquire permission to read or access one or more blocks of the distributed ledger, to acquire permission to request an iteration be added to the ledger, to acquire permission to request a new block be added to the ledger, to acquire permission to verify an iteration or a new block, to acquire permission to finalize the appending of a new block (and transmit the new block and/or updated ledger to the distributed architecture 425), or some combination thereof.

Whether a distributed ledger as used herein is public or private, storage of data in the distributed ledger provides protection from outages or data corruption in that data associated with a particular provider is stored on additional devices, and diversifies how important data within the provider's organization is stored. In an embodiment, sensitive data, such as the full name and the address of the owners may be kept in a private ledger whereas less sensitive data, such as the GPS location and other metadata of the media capture, iteration number of the digital media asset, and description of the changes to the digital media asset along with other metadata associated with the digital media asset may be kept in a public distributed ledger.

Figure 5:
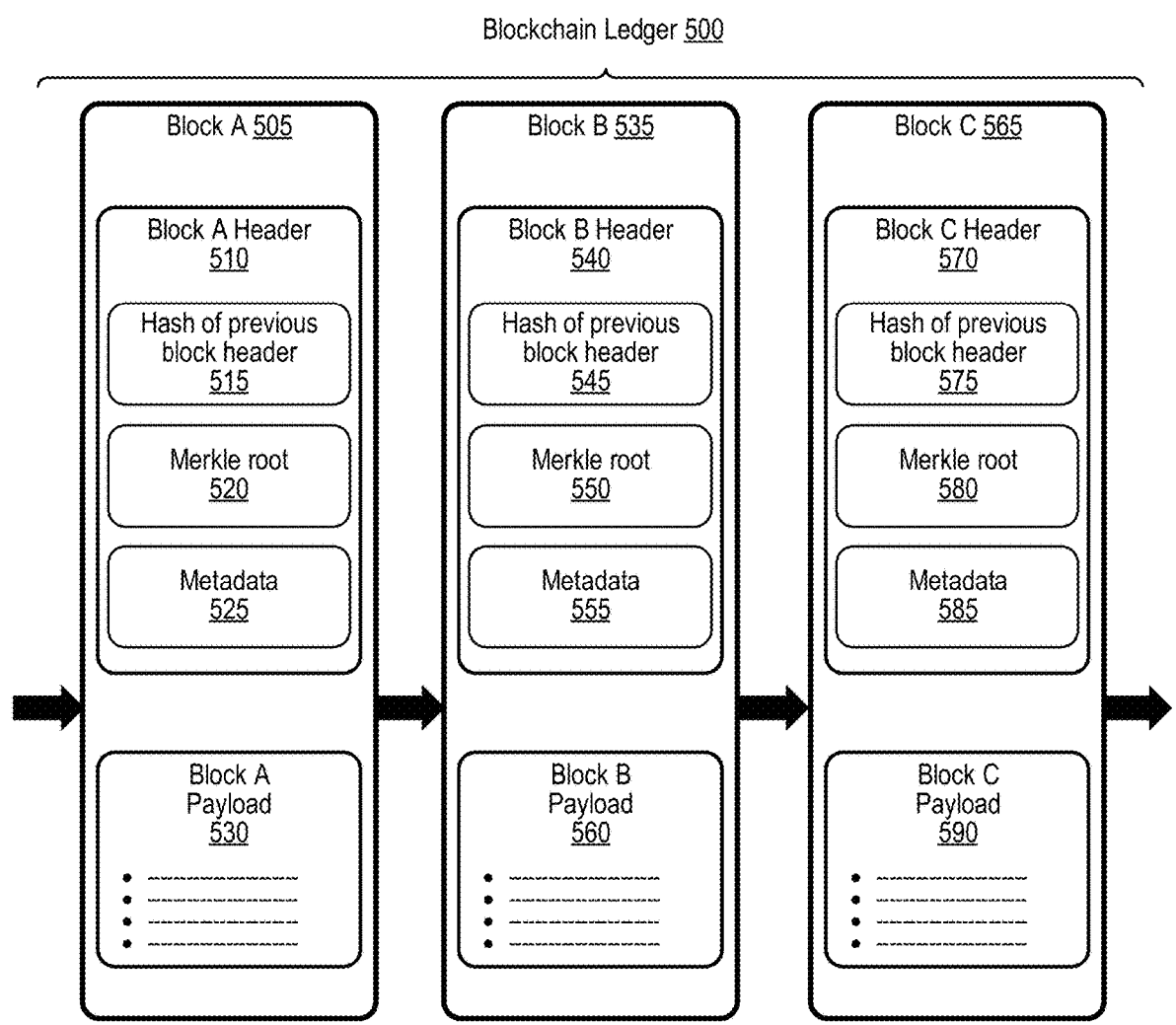
FIG. 5 illustrates a portion of a distributed ledger that implements distributed digital media asset tracking and authentication.

FIG. 5 illustrates a portion of a distributed ledger that implements distributed digital media asset tracking and authentication. Three blocks—Block A 505, Block B 535, and Block C 565—of the blockchain ledger 500 are illustrated in FIG. 5.

Each block includes a block header 510/540/570 and a payload 530/560/590. The payload may include one or more payload elements, such as transactions, smart contracts (e.g., executable code), and/or tokens (e.g., non-fungible tokens). The payload elements may be used to identify iterations of a digital media asset, modifications to the digital media asset, annotations made to the digital media asset, ownership of the digital media asset, transfer of ownership of the digital media asset from a first owner to a second owner, fungibility of the digital media asset, price of the digital media asset, rental of the digital asset from an owner for a limited period of time and/or with limitations on types of permissible use, metadata associated with any of the previously-listed content, or combinations thereof. In some examples, a payload element may include a copy of the digital media asset. In some examples, a payload element may include a pointer, such as a uniform resource identifier (URI) or uniform resource locator (URL), to a copy of the digital media asset that is stored in a data structure off of the distributed ledger. Examples of the data structure include a database, a distributed hash table (DHT), an InterPlanetary File System (IPFS), a tree, a hash table, or a combination thereof. In some examples, a payload element can include a hash of the digital media asset that is stored in the data structure, so that a verifying device can compute a hash of the digital media asset that is stored in the data structure and compare the computed hash to the stored hash that is stored as part of the payload element of the blockchain ledger 500 to verify that the digital media asset that is stored in the data structure is accurate.

The block header 510 includes a hash of the block header of the previous block 515/545/575, which may alternately be replaced or supplemented by a hash of the entire previous block. For instance, the header 570 of block C 565 includes a hash 575 of the header 540 of block B 535. The header 540 of block B 535 likewise includes a hash 545 of the header 510 of block A 505. The header 510 of block A 505 likewise includes a hash 515 of a header (not pictured) of previous block (not pictured) that is before block A 505 in the blockchain ledger 500. Including the hash of the previous block's header secures the blockchain ledger 500 by preventing modification of any block of the blockchain ledger 500 after the block has been entered into the blockchain ledger 500, as any change to a particular block would cause that block header's hash in the next block to be incorrect. Further, modification of that block header's hash in the next block would make the next block's header's hash in the block after the next block incorrect, and so forth.

Figure 6:
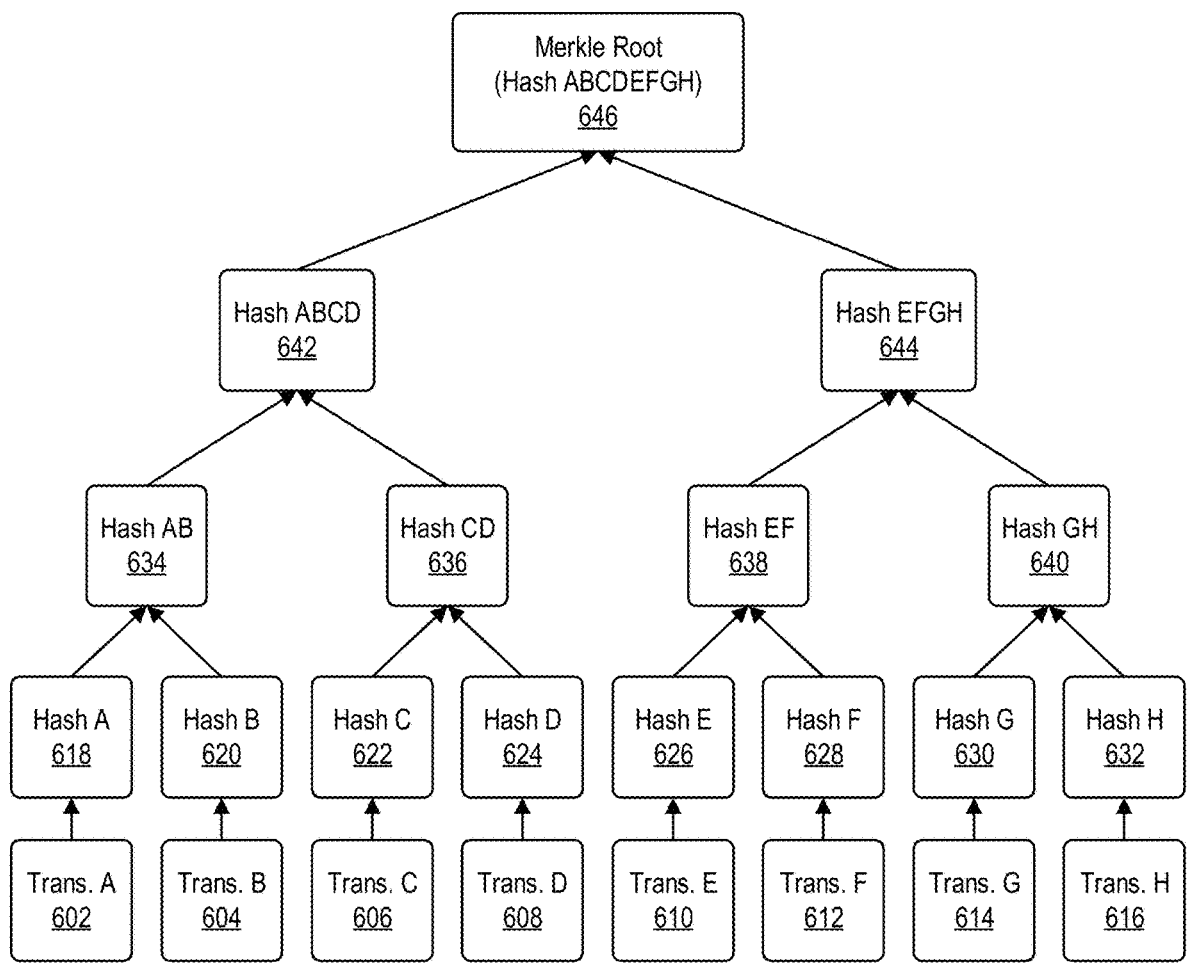
FIG. 6 illustrates a portion of a distributed ledger that implements distributed digital media asset tracking and authentication.

Each block's block header 510/540/570 also includes a Merkle root 520/550/580, which is generated based on hashes of all of the payload elements of the payload 530/560/590 of that block as explained further with respect to FIG. 6. Any attempt to modify any payload element of a payload 530/560/590 after the block has been entered would change the Merkle root 520/550/580, which would change the hash 515/545/575 of the block header 510/540/570, again allowing all nodes to see if any block has been tampered with.

Each block's block header 510/540/570 may also include various elements of metadata, such as a version number for the distributed ledger platform, a version number for the block, a timestamp for generation of the block, or a combination thereof.

Each block 505/535/565 of the blockchain ledger 500 also includes a payload 530/560/590 with one or more payload elements. These payload elements may each identify iterations of the digital media asset, for example conveying information corresponding to, for example, an ownership history, iteration version, extent of the modification to the digital media asset, licenses given or obtained, royalty payments given or obtained, other characteristics of the iteration, changes to any of the previously-listed types of information, or combinations thereof. When requested to display a history of the digital media asset, a device accessing the blockchain ledger 500, such as client device 230 or computing device 310, may display a user interface displaying at least a subset of the history of the digital media asset, such as a chain of ownership, number of iterations, each version of the digital media asset associated with each of the iteration, displaying the extent of the modification in each of the iterations, or a combination thereof.

While FIG. 5 only illustrates three blocks 505/535/565 of the blockchain 500, it should be understood that any blockchain discussed herein may be longer or shorter in that it may have more or fewer than three blocks.

FIG. 6 is a diagram of a Merkle tree for iteration tracking and authentication using the distributed ledger. The Merkle tree of FIG. 6 is used to generate a Merkle root 646 for a block with 8 iterations: iteration A 602, iteration B 604, iteration C 606, iteration D 608, iteration E 610, iteration F 612, iteration G 614, and iteration H 616.

A hash is generated for each iteration. Iteration A 602 is hashed into hash A 618, iteration B 604 is hashed into hash B 620, iteration C 606 is hashed into hash C 622, iteration D 608 is hashed into hash D 624, iteration E 610 is hashed into hash E 626, iteration F 612 is hashed into hash F 628, iteration G 614 is hashed into hash G 630, and iteration H 616 is hashed into hash H 632.

Each of the hashes A 618 through H 632 are hashed after being paired with another hash. That is, Hash A 618 and Hash B 620 are hashed together into Hash AB 634, Hash C 622 and Hash D 624 are hashed together into Hash CD 636, Hash E 626 and Hash F 628 are hashed together into Hash EF 638, and Hash G 630 and Hash H 632 are hashed together into Hash GH 640.

This process repeats until a single hash results. That is, Hash AB 634 and Hash CD 636 are hashed together into Hash ABCD 642, and Hash EF 638 and Hash GH 640 are hashed together into Hash EFGH 644. Hash ABCD 642 and Hash EFGH 644 are hashed together into Hash ABCDEFGH 646. Hash ABCDEFGH 646 is also known as the Merkle root 646 for the 8 iterations: iteration A 602, iteration B 604, iteration C 606, iteration D 608, iteration E 610, iteration F 612, iteration G 614, and iteration H 616. Any modification to any of these 8 iterations also necessarily changes the Merkle root 646, which can be verified by any node to ensure that no changes were made to the iterations in any given block.

Figure 7:
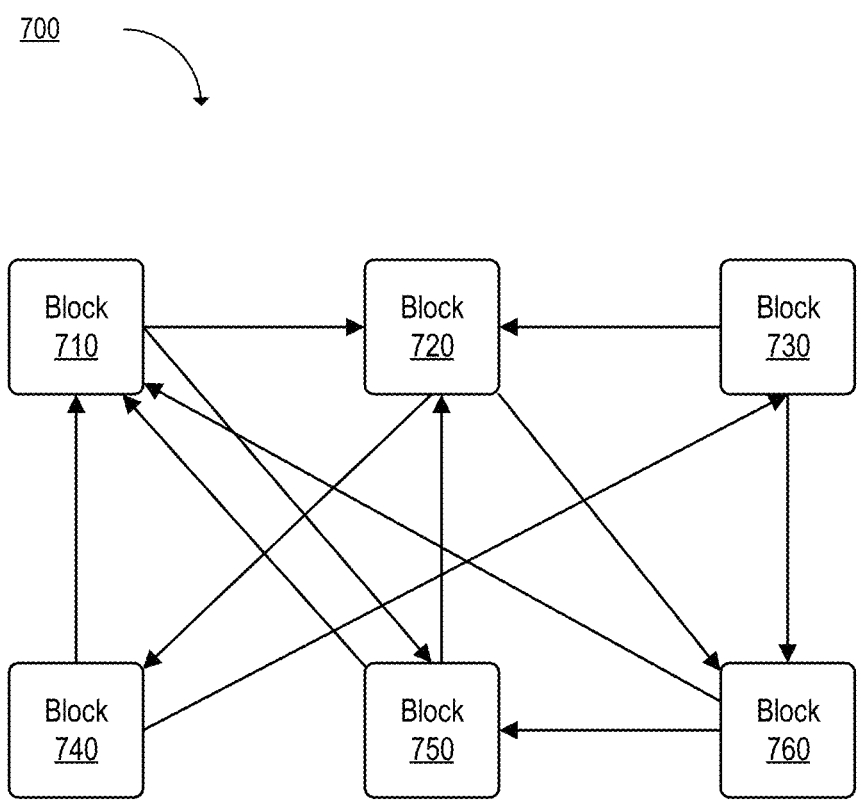
FIG. 7 is a diagram of a Merkle tree for iteration tracking and authentication using the distributed ledger.

The hashes used in the Merkle root calculation of FIG. 6, the hashes of previous block discussed with respect to FIG. 5, and the hashes of parent blocks discussed with respect to FIG. 7, are generated using a hash algorithm, which may optionally be a secure hash algorithm (SHA), such as SHA-0, SHA-1, SHA-2, SHA-3, SHA-N, SHA-128, SHA-192, SHA-256, SHA-512, SHA-224, SHA-384, SHA-512/224, SHA-512/256, SHA3-224, SHA3-256, SHA3-384, SHA3-512, SHAKE128, or one or more variants or combinations thereof.

FIG. 7 illustrates a portion of a distributed directed acyclic graph (DAG) ledger 700 that implements distributed digital media asset tracking and authentication. While FIG. 5 discuss use of a blockchain ledger 500, it should be understood that a non-linear ledger structure, such as the directed acyclic graph (DAG) ledger 700 structure of FIG. 7, may be used instead of a blockchain ledger 500 discussed herein. That is, the term "distributed ledger" as used herein should be understood to refer to at least one of a blockchain ledger 500 (as in FIG. 5), a DAG ledger 700 (as in FIG. 7), or a combination thereof. In a DAG ledger, each block header includes the hashes of block headers of a predetermined number of other "parent" blocks in the DAG ledger selected either at random or in some other non-linear manner, rather than the hash of a single previous block in the blockchain. Each block header may alternately or additionally include hashes of the entire parent blocks instead of hashes of just the headers of the parent blocks. Where each block header includes multiple hashes corresponding to different parent blocks or their headers, these hashes can be combined together into a Merkle root much like the hashes A 618, B 620, C 622, D 624, E 626, F 628, G 630, and H 632 of FIG. 6.

For example, in the DAG ledger of FIG. 7, the predetermined number is two, at least after the first two blocks are generated. In the DAG ledger of FIG. 7, the parent blocks are indicated using arrows. Block 710 includes hashes of the block headers of parent blocks 720 and 750. Block 720 includes hashes of the block headers of parent blocks 740 and 760. Block 730 includes hashes of the block headers of parent blocks 720 and 760. Block 740 includes hashes of the block headers of parent blocks 710 and 730. Block 750 includes hashes of the block headers of parent blocks 710 and 720. Block 760 includes hashes of the block headers of parent blocks 710 and 750. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some cases, the number of parent blocks in a DAG ledger is not strictly predetermined, but there is a predetermined minimum number of blocks, such as a two-parent minimum or a one-parent minimum, meaning that each block has at least the predetermined minimum number of parent blocks. In some cases, each block in a DAG ledger may only include a single payload element (e.g., identifying a single iteration) rather than multiple payload elements (e.g., identifying multiple iterations), and may therefore forego a Merkle root and/or replace it with a hash of the single payload element. In other implementations, each block may identify multiple payload elements associated with multiple iterations corresponding to a predetermined time period as discussed herein.

Potential benefits of distributed DAG ledgers over blockchain ledgers may include parallelized validation, which results in higher throughput.

FIG. 8 is a flow diagram illustrating operations 800 for digital media asset authentication and tracking via distributed ledger. The operations 800 illustrated in FIG. 8 may be performed by a digital asset tracking system. The digital asset tracking system can include, for instance, the authentication and tracking system 200, the computing device 205, a device that is part of the cloud 220, a server 225, a client device 230, a device storing the distributed ledger 250, a device hosting the web portal 240, a device accessing the web portal 240, a computing device 300, a user device 420, a secure server 450, one or more computing devices of a distributed architecture 425, a device storing the blockchain ledger 500, a device storing the directed acyclic graph (DAG) ledger 700, the digital asset tracking system that performs the operations 800, a computing system 900, or a combination thereof.

At operation 805, the digital asset tracking system stores a distributed ledger comprising a plurality of blocks, wherein each of a plurality of computing devices also stores a copy of the distributed ledger. Examples of the distributed ledger include the distributed ledger 250, the distributed ledger(s) 430, the blockchain ledger 500, the DAG ledger 700, or a combination thereof. Examples of the plurality of blocks include block A 505, block B 535, block C 565, block 710, block 720, block 730, block 740, block 750, block 760, or a combination thereof. Examples of the plurality of computing devices include the computing devices of the distributed architecture 425, the user device 420, the computing device 205, the servers 225, the client device 230, or a combination thereof. A digital media captured via the computing device 205 or user device 420 may be stored in a distributed architecture 425 and/or at servers 225. The distributed architecture 425 includes distributed ledgers such as distributed ledger 250, distributed ledger(s) 430, or DAG ledger 700. In an embodiment, the distributed ledger 250 or the distributed ledger(s) 430 may include a plurality of blocks such as block A 505, block B 535, or block C 565. In another embodiment, the DAG ledger 700 may include a plurality of blocks such as block 730, block 740, block 750, or block 760. The stored digital media may be accessible by client device 230.

At operation 810, the digital asset tracking system receives a digital media asset from a first computing device. The digital media asset may be an image file, a video, audio, map, satellite photo, or some combination thereof. In some examples, operation 810 may also include the digital asset tracking system receiving more than one digital media assets. Examples of the digital media asset include digital media assets captured by the computing device 205, the digital media asset 320, the digital media asset 405, the digital media asset of operation 105, the certified digital media asset dataset of operations 140-150, or a combination thereof. Public and private keys corresponding to the digital media asset may be generated as part of the verification processes. In some examples, the digital media asset may be certified digital media asset as certified based on the certification process of FIG. 1. In some examples, the digital media asset may be referred to as an authenticated digital media asset or a certified digital media asset.

At operation 820, the digital asset tracking system generates a hash of at least a portion of a most recent block of the distributed ledger. Examples of the hash include the hash 515, the hash 545, the hash 575, or a combination thereof. In some examples, the hash is a hash of the entirety of the most recent block of the distributed ledger. In some examples, the hash is a hash of a portion of the most recent block of the distributed ledger, such as the block header of the most recent block of the distributed ledger, the payload of the most recent block of the distributed ledger, or a combination thereof. Operation 825 includes generating a new block header for a new block, wherein the new block header comprises at least the hash of at least the portion of the most recent block of the distributed ledger. Examples of the block header include the block A header 510, the block B header 540, the block C header 570, or a combination thereof.

At operation 830, the digital asset tracking system generates the new block, wherein the new block comprises at least the new block header and one or more iterations corresponding to one or more changes in the digital media asset. Such changes may include, for example, changing the background of the digital media asset, removing or adding an object or a person in the digital media, altering colors of the digital media asset, altering the metadata associated with the digital media asset, such as the date and location of the capture of the digital media asset, overlaying or splicing another digital media on the digital media asset, removing or cropping parts of the digital media asset, or otherwise contributing to any change in pixels of the digital media asset, or combinations thereof. Thus, the changes to the digital media asset may be to one or more portions of the digital media asset.

The tracking system may determine the extent of the changes made to the digital media asset by utilizing an image processing system that compares the new iteration of the digital media asset to the prior iteration of the digital media asset. The image processing system may compare differences in color, hue, saturation, value, brightness, color temperature, and/or intensity of each pixels to identify changes made to the digital media asset. The image processing system may also compare the image resolution, scaled resolution, pixel count, patches, texture, boundaries, objects in the digital media asset. In some examples, the image processing system may use a keypoint extraction and/or keypoint matching algorithm to compare the two iterations of the digital media asset. In some examples, the image processing system may use a feature extraction and/or feature matching algorithm to compare the two iterations of the digital media asset. The keypoints and/or features that the image processing system extracts and compares may be scale-invariant feature transform (SIFT) in some examples. The keypoints and/or features that the image processing system extracts and compares may include edges, corners, blobs (e.g., image regions in which some properties are constant or approximately constant), or combinations thereof. In some examples, the features and/or keypoints may be stored as vectors, and comparison of corresponding features and/or keypoints between different iterations of the digital media asset may include comparison of the directions and/or amplitudes of the vectors. In some examples, the image processing system may extract the features and/or keypoints, compare the features and/or keypoints, and/or compare the iterations of the digital media asset using one or more artificial intelligence (AI) algorithms, one or more trained machine learning (ML) systems, one or more trained neural networks (NNs), one or more trained support vector machines (SVMs), one or more trained random forests, or a combination thereof.

Operations 820, 825, and 830 are discussed further with respect to the blocks of FIG. 5 and FIG. 7. Operations 820,

825, and 830 may occur automatically in response to successful completion of the verification processes operation 135 in FIG. 1.

At operation 835, the digital asset tracking system appends the new block to the plurality of blocks of the distributed ledger. This may occur automatically in response to generation of the new block in operation 830.

At operation 840, the digital asset tracking system transmits the new block to the plurality of computing devices that each store the distributed ledger in response to verifying the intended iteration, wherein each of the plurality of computing devices also appends the new block to their respective copy of the distributed ledger, thereby recording the one or more iterations in the distributed ledger. This may occur automatically in response to generation of the new block in operation 830 and/or in response to appending the new block at operation 840.

The tracking system may work in conjunction with an artificial intelligence to find digital media asset on the internet that are unpermitted modifications from the authenticated digital media asset stored in the secure server. The artificial intelligence may passively search for misappropriation of the assets stored in the secure server, found on the web, or otherwise available at a web location, and determine the appropriate action in response to finding modified digital media asset that were misappropriated. Possible misappropriation may include unlicensed or unauthorized use or sale of the digital media asset, stripping out all or parts of the digital media asset or the metadata of the digital media asset in order to remove the association of the digital media asset to the secure server or the owners of the digital media asset, and unlicensed or unauthorized modification of the digital media asset. If the digital media asset does not have an iteration history in the distributed ledger but parts or all of the digital media asset originated from the digital media stored in the secure server, the tracking system may determine the extent of the modification by utilizing an artificial intelligence, which iteration the unauthorized digital media was based on, and alert the rightful owners of the digital media asset that a possible copyright infringement or misappropriation has occurred.

The tracking system may store and identify usage permission of the digital media asset in the distributed ledger. For example, the tracking system may track royalties owed to the original digital media asset owner, license issued by the original or subsequent owners with a power to grant licenses, and the history of payment of such royalties or licenses by the subsequent users of the digital media. The tracking system may work in conjunction with financial services to facilitate and record the payment of royalties or licenses. The secure server may store authenticated licensing documents between the grantor and the grantee of the licenses such that the licensing information is verified. The original digital media owner may manually input or attach the licensing, royalty, or payment received in the description of the digital media asset. The tracked information may be stored in the secure server and in the distributed ledgers. Each iteration of the digital media asset may include information regarding the permission obtained to make such iteration. When a misappropriated digital media is found, the tracking system may search for the owners or other entities to notify based on the usage permission information stored in the distributed ledger.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

Figure 9:
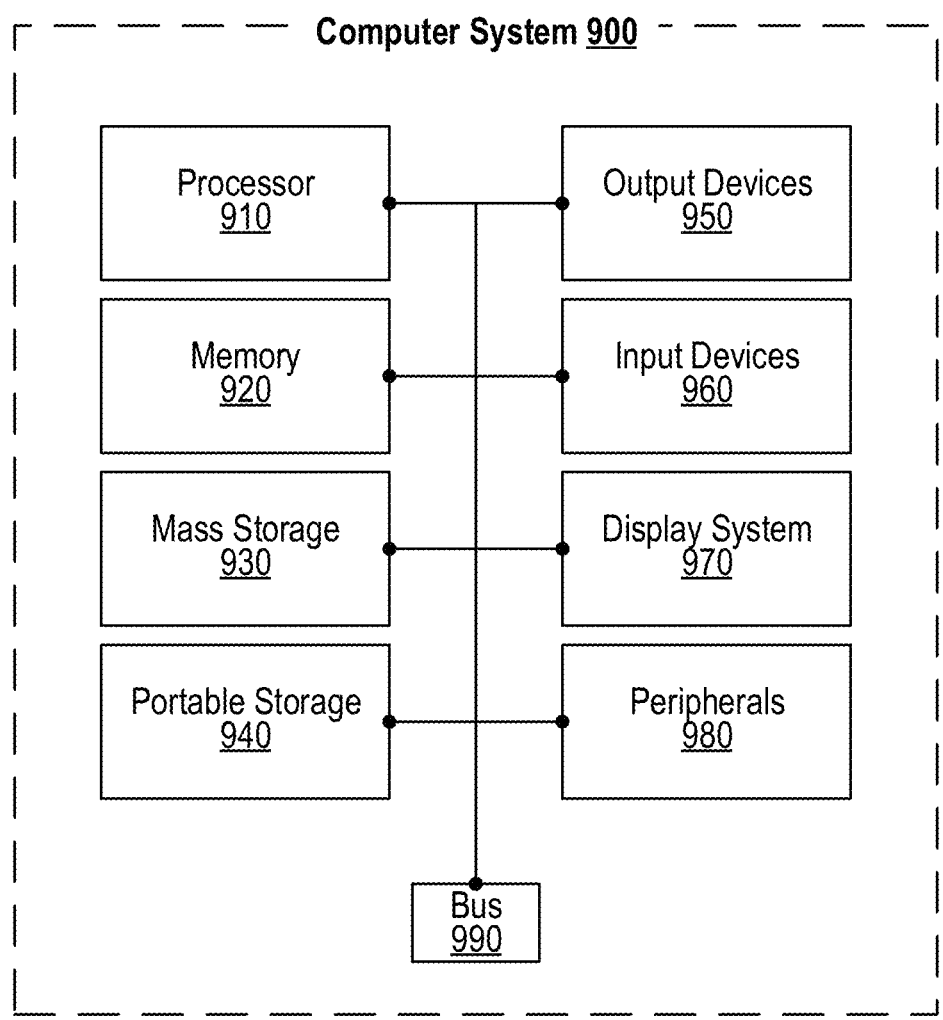
FIG. 9 is a block diagram illustrating an example of a computing system for implementing certain aspects described herein.

FIG. 9 is a block diagram illustrating an example of a computing system for implementing certain aspects described herein. FIG. 9 illustrates an exemplary computing system 900 that may be used to implement some aspects of the technology. For example, any of the computing devices, computing systems, network devices, network systems, servers, and/or arrangements of circuitry described herein may include at least one computing system 900, or may include at least one component of the computer system 900 identified in FIG. 9. The computing system 900 of FIG. 9 includes one or more processors 910 and memory 920. Each of the processor(s) 910 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 910 may include one or more cores, either integrated onto a single chip or spread across multiple chips connected or coupled together. Memory 920 stores, in part, instructions and data for execution by processor 910. Memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing some aspects of the subject technology for purposes of loading that software into memory 920.

Portable storage device 940 operates in conjunction with a portable non-volatile storage medium, such as a floppy disk, compact disk or Digital video disc, to input and output data and code to and from the computer system 900 of FIG. 9. The system software for implementing aspects of the subject technology may be stored on such a portable medium and input to the computer system 900 via the portable storage device 940.

The memory 920, mass storage device 930, or portable storage 940 may in some cases store sensitive information, such as transaction information, health information, or cryptographic keys, and may in some cases encrypt or decrypt such information with the aid of the processor 910. The memory 920, mass storage device 930, or portable storage 940 may in some cases store, at least in part, instructions, executable code, or other data for execution or processing by the processor 910.

Output devices 950 may include, for example, communication circuitry for outputting data through wired or wireless means, display circuitry for displaying data via a display screen, audio circuitry for outputting audio via headphones or a speaker, printer circuitry for printing data via a printer, transcription or some combination thereof. The display screen may be any type of display discussed with respect to the display system 970. The printer may be inkjet, LaserJet, thermal, or some combination thereof. In some cases, the output device circuitry 950 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 950 may include any ports, plugs, antennae, wired or wireless transmitters, wired or wireless transceivers, or any other components necessary for or usable to implement the communication types listed above, such as cellular Subscriber Identity Module (SIM) cards.

Input devices 960 may include circuitry providing a portion of a user interface. Input devices 960 may include an alpha-numeric keypad, such as a keyboard, for inputting alpha-numeric and other information, or a pointing device, such as a mouse, a trackball, stylus, or cursor direction keys. Input devices 960 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 960 may include any ports, plugs, antennae, wired or wireless receivers, wired or wireless transceivers, or any other components necessary for or usable to implement the communication types listed above, such as cellular SIM cards.

Input devices 960 may include receivers or transceivers used for positioning of the computing system 900 as well. These may include any of the wired or wireless signal receivers or transceivers. For example, a location of the computing system 900 can be determined based on signal strength of signals as received at the computing system 900 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 900 such as a router, modem, switch, hub, bridge, gateway, or repeater. These may also include Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 960 may include receivers or transceivers corresponding to one or more of these GNSS systems.

Display system 970 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include one or more additional output devices of any of the types discussed with respect to output device 950, one or more additional input devices of any of the types discussed with respect to input device 960, one or more additional display systems of any of the types discussed with respect to display system 970, one or more memories or mass storage devices or portable storage devices of any of the types discussed with respect to memory 920 or mass storage 930 or portable storage 940, a modem, a router, an antenna, a wired or wireless transceiver, a printer, a bar code scanner, a quick-response ("QR") code scanner, a magnetic stripe card reader, a integrated circuit chip (ICC) card reader such as a smart-card reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 900 of FIG. 9 can include those typically found in computer systems that may be suitable for use with some aspects of the subject technology and represent a broad category of such computer components that are well known in the art. That said, the computer system 900 of FIG. 9 can be customized and specialized for the purposes discussed herein and to carry out the various operations discussed herein, with specialized hardware components, specialized arrangements of hardware components, and/or specialized software. Thus, the computer system 900 of FIG. 9 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 900 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 900 may also use a Basic Input/Output System (BIOS) or Unified Extensible Firmware Interface (UEFI) as a layer upon which the operating system(s) are run.

In some cases, the computer system 900 may be part of a multi-computer system that uses multiple computer systems 900, each for one or more specific tasks or purposes. For example, the multi-computer system may include multiple computer systems 900 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 900 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 920, the mass storage 930, the portable storage 940, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L16), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 910 for execution. A bus 990 carries the data to system RAM or another memory 920, from which a processor 910 retrieves and executes the instructions. The instructions received by system RAM or another memory 920 can optionally be stored on a fixed disk (mass storage device 930/portable storage 940) either before or after execution by processor 910. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 900 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of digital media asset tracking using a distributed ledger stored at each of a plurality of computing devices of a distributed computing architecture, the method comprising:
   storing the distributed ledger associated with a digital media asset, the distributed ledger including a plurality of blocks storing information about the digital media asset;
   extracting, using a scale-invariant feature transform (SIFT) algorithm, a first set of one or more image features of an iteration of the digital media asset;
   extracting, using the SIFT algorithm, a second set of one or more image features of a previous iteration of the digital media asset;
   identifying that the iteration of the digital media asset includes a modification to the digital media asset relative to the previous iteration of the digital media asset at least in part by comparing the first set of one or more image features to the second set of one or more image features, wherein the modification to the digital media asset includes a change in at least one pixel of the digital media asset;
   generating a new block in response to identifying that the iteration of the digital media asset includes the modification, wherein the new block includes a payload indicative of the modification in the iteration of the digital media asset relative to the previous iteration of the digital media asset, wherein the new block includes a new block header that includes a hash of at least a portion of a prior block of the distributed ledger; and
   appending the new block to the plurality of blocks of the distributed ledger.

2. The method of claim 1, further comprising transmitting the new block to one or more of the plurality of computing devices, wherein each of the plurality of computing devices appends the new block to a respective copy of the distributed ledger.

3. The method of claim 1, further comprising:
   verifying that the digital media asset is unaltered from a time of capture of the digital media asset by a digital media capture device based on an encrypted hash of the digital media asset and an encrypted hash of metadata of the digital media asset.

4. The method of claim 1, further comprising:
   determining that a second digital media asset is accessible at a web location and is based on the digital media asset based on a comparison of the first set of one or more image features extracted from the digital media asset to the second set of one or more image features extracted from the second digital media asset.

5. The method of claim 1, further comprising:
   identifying that a second digital media asset is accessible at a web location and is based on the digital media asset; and
   identifying whether a usage permission is granted for the second digital media asset to be accessible at the web location.

6. The method of claim 5, further comprising:
   sending a notification to an owner of the digital media asset upon identifying whether the usage permission is granted for the second digital media asset to be accessible at the web location.

7. The method of claim 1, further comprising:
   identifying the modification at least in part by using at least a portion of the iteration of the digital media asset and at least a portion of the previous iteration of the digital media asset as inputs to a trained machine learning model.

8. The method of claim 1, wherein the distributed ledger includes metadata associated with a capture of the digital media asset.

9. The method of claim 1, further comprising displaying a history of the digital media asset, wherein the history of the digital media asset includes information associated with one or more iterations.

10. The method of claim 1, wherein identifying that the iteration of the digital media asset includes the modification includes receiving the iteration of the digital media asset from a generating device that generates the iteration of the digital media asset.

11. The method of claim 1, wherein identifying that the iteration of the digital media asset includes the modification includes generating the iteration of the digital media asset.

12. The method of claim 1, further comprising:
   receiving the digital media asset from an image sensor that captures the digital media asset.

13. The method of claim 1, wherein the first set of one or more image features are stored as a first set of one or more vectors, wherein the second set of one or more image features are stored as a second set of one or more vectors, and wherein identifying that the iteration of the digital media asset includes the modification is based on identifying a difference between the first set of one or more vectors and the second set of one or more vectors.

14. The method of claim 13, wherein the difference between the first set of one or more vectors and the second set of one or more vectors is a difference in at least one of a vector direction or a vector amplitude.

15. A system for digital media asset tracking using a distributed computing architecture, the system comprising:
   a memory storing instructions; and
   a processor that executes the instructions, wherein execution of the instructions causes the processor to:
      store a distributed ledger associated with a digital media asset, the distributed ledger including a plurality of blocks storing information about the digital media asset;
      extract, using a scale-invariant feature transform (SIFT) algorithm, a first set of one or more image features of an iteration of the digital media asset;
      extract, using the SIFT algorithm, a second set of one or more image features of a previous iteration of the digital media asset;
      identify that the iteration of the digital media asset includes a modification to the digital media asset relative to the previous iteration of the digital media asset at least in part by comparing the first set of one or more image features to the second set of one or more image features, wherein the modification to the digital media asset includes a change in at least one pixel of the digital media asset;

generate a new block in response to identifying that the iteration of the digital media asset includes the modification, wherein the new block includes a payload indicative of the modification in the iteration of the digital media asset relative to the previous iteration of the digital media asset, wherein the new block includes a new block header that includes a hash of at least a portion of a prior block of the distributed ledger; and append the new block to the plurality of blocks of the distributed ledger.

16. The system of claim 15, wherein the execution of the instructions causes the processor to:

transmit the new block to one or more of a plurality of computing devices of the distributed computing architecture, wherein each of the plurality of computing devices appends the new block to a respective copy of the distributed ledger.

17. The system of claim 15, wherein execution of the instructions causes the processor to:

determine that a second digital media asset is accessible at a web location and is based on the digital media asset based on a comparison of the first set of one or more image features extracted from the digital media asset to the second set of one or more image features extracted from the second digital media asset.

18. The system of claim 15, further comprising:

an image sensor that captures the digital media asset.

19. The system of claim 15, further comprising:

a display that displays the iteration of the digital media asset.

20. The system of claim 15, wherein the execution of the instructions causes the processor to:

verify that the digital media asset is unaltered from a time of capture of the digital media asset by a digital media capture device based on an encrypted hash of the digital media asset and an encrypted hash of metadata of the digital media asset.

21. The system of claim 15, wherein the execution of the instructions causes the processor to:

identify the modification at least in part by using at least a portion of the iteration of the digital media asset and at least a portion of the previous iteration of the digital media asset as inputs to a trained machine learning model.

22. The system of claim 15, wherein identifying that the iteration of the digital media asset includes the modification includes receiving the iteration of the digital media asset from a generating device that generates the iteration of the digital media asset.

23. A non-transitory computer-readable storage medium, having embodied thereon a program executable by a processor to perform a method of digital media asset tracking using a distributed ledger stored at each of a plurality of computing devices of a distributed computing architecture, the method comprising:

storing the distributed ledger associated with a digital media asset, the distributed ledger including a plurality of blocks storing information about the digital media asset;

extracting, using a scale-invariant feature transform (SIFT) algorithm, a first set of one or more image features of an iteration of the digital media asset;

extracting, using the SIFT algorithm, a second set of one or more image features of a previous iteration of the digital media asset;

identifying that the iteration of the digital media asset includes a modification to the digital media asset relative to the previous iteration of the digital media asset at least in part by comparing the first set of one or more image features to the second set of one or more image features, wherein the modification to the digital media asset includes a change in at least one pixel of the digital media asset;

generating a new block in response to identifying that the iteration of the digital media asset includes the modification, wherein the new block includes a payload indicative of the modification in the iteration of the digital media asset relative to the previous iteration of the digital media asset, wherein the new block includes a new block header that includes a hash of at least a portion of a prior block of the distributed ledger; and appending the new block to the plurality of blocks of the distributed ledger.

* * * * *